(12) United States Patent
Kuo et al.

(10) Patent No.: US 8,693,182 B2
(45) Date of Patent: Apr. 8, 2014

(54) FIXING MECHANISM FOR STORAGE DEVICE

(75) Inventors: Po-Hsiu Kuo, Taipei County (TW);
Chih-Li Liu, Taipei County (TW);
Yung-Lung Liu, Taipei County (TW);
Chuan-Chieh Tseng, Taipei County (TW)

(73) Assignees: Lite-On Electronic (Guangzhou) Limited, Guangzhou (CN); Lite-On Technology Corporation, Taipei (TW)

( * ) Notice: Subject to any disclaimer, the term of this patent is extended or adjusted under 35 U.S.C. 154(b) by 243 days.

(21) Appl. No.: 13/222,030

(22) Filed: Aug. 31, 2011

(65) Prior Publication Data
US 2012/0074279 A1    Mar. 29, 2012

(30) Foreign Application Priority Data

Sep. 24, 2010  (TW) .............................. 99218496 U

(51) Int. Cl.
*G06F 1/16*     (2006.01)
*H05K 7/16*    (2006.01)

(52) U.S. Cl.
USPC ................ 361/679.33; 248/220.21; 248/694; 312/232.2; 361/679.37; 361/726

(58) Field of Classification Search
USPC .................. 248/27.1, 27.3, 609, 222.11, 200, 248/220.21, 694; 312/223.1, 223.2, 333, 312/334.44, 334.7, 334.1, 349; 361/679.33, 361/679.34, 679.37, 679.38, 679.58, 361/679.59, 725, 801, 679.43, 685, 686, 361/683, 726
See application file for complete search history.

(56) References Cited

U.S. PATENT DOCUMENTS

| | | | | |
|---|---|---|---|---|
| 5,262,923 A * | 11/1993 | Batta et al. | ............... | 361/679.37 |
| 6,396,686 B1 * | 5/2002 | Liu et al. | ................. | 361/679.33 |
| 6,442,020 B1 * | 8/2002 | Liu et al. | ................. | 361/679.33 |
| 6,590,775 B2 * | 7/2003 | Chen | ......................... | 361/679.33 |
| 6,614,654 B2 * | 9/2003 | Chen et al. | ............... | 361/679.33 |
| 6,999,309 B2 * | 2/2006 | Hsu | ............................ | 312/223.1 |

* cited by examiner

*Primary Examiner* — Tan Le
(74) *Attorney, Agent, or Firm* — Morris Manning & Martin LLP; Tim Tingkang Xia, Esq.

(57) ABSTRACT

A fixing mechanism for storage device includes a frame, and a detent component. One sidewall of the frame has a latch member. The detent component is movably disposed on the sidewall of the frame, and has a pressing component and an operating component. The operating component is disposed with at least one stop block. When the operating component is moved relative to the frame to a press position, the pressing component pushes the latch member to engage with the storage device, the stop block is embedded in the frame, and the detent component is held in the press position. Accordingly, the storage device may be fixed to the frame rapidly without using any screw, the operating procedure is dramatically simplified, and the space occupied by the fixing mechanism and the manufacturing cost are reduced.

9 Claims, 15 Drawing Sheets

FIXING MECHANISM FOR STORAGE DEVICE

CROSS-REFERENCE TO RELATED APPLICATIONS

This non-provisional application claims priority under 35 U.S.C. §119(a) on Patent Application No(s). 099218496 filed in Taiwan, R.O.C. on Sep. 24, 2010, the entire contents of which are hereby incorporated by reference.

BACKGROUND OF THE INVENTION

1. Field of the Invention

The present invention relates to a fixing mechanism, and more particularly to a fixing mechanism for installing a storage device in a computer housing without using any screw.

2. Description of Related Art

Personal computers (PC) typically employ Direct Access and Storage Devices (DASDs) such as hard disk drives (HDD) and optical disk drives (ODD). These devices are typically maintained in the mechanical chassis of a computer housing. This configuration includes a DASD that slides into or is bolted to the mechanical chassis of the computer housing.

However, a problem facing the industry is the inability of users and manufacturers to quickly interchange DASDs. DASDs are typically mounted to the mechanical chassis of a computer housing via screws. For personal computer (PC) manufactures and users, this is a problem which leads to a complex production procedure and a high labor cost, and also affects the production efficiency. By using screws to attach the DASD, the PC manufacturer/user is subsequently forced to use a screw driver or similar tool to remove the DASD. Since PC retailers and service organizations typically charge hourly rates for assembling and disassembling computer systems, it is desirable that assembling/disassembling process take as little time as possible.

Additionally, as the number of the screws is large and the size thereof is small, some of the screws may be left inside the computer housing, contact the circuit board and cause short circuit.

Accordingly, what is needed is a fixing mechanism for installing a storage device in a computer that solves these problems. The present invention addresses these needs.

SUMMARY OF THE INVENTION

Therefore, an object of the present invention is to provide a fixing mechanism for storage device that can alleviate the aforesaid drawbacks of the prior art.

Accordingly, a fixing mechanism in an embodiment of the present invention for fixing a storage device to an electronic device comprises a frame, and a detent component. The storage device has a fixing hole formed in at least one sidewall thereof. The frame has an accommodating space for receiving the storage device. A sidewall of the frame corresponding to the fixing hole has a guide rail and a latch member, and the sidewall of the frame has a limit component corresponding to the guide rail. The detent component has a pressing component and an operating component, and is movably disposed on the sidewall of the frame. The pressing component is movably connected to the guide rail, and the operating component has a stop block.

The operating component is moved to make the pressing component move toward the latch member along the guide rail to push the latch member to engage with the fixing hole of the storage device, and to make the stop block stop at the limit component in a press position, so that the storage device is fixed on the frame.

The operating component is pressed to make the stop block depart from the limit component, the operating component is moved in a reverse direction, and the pressing component is moved away from the latch member, so that the latch member departs from the fixing hole in a release position, and the storage device is drawn out of the frame.

Another fixing mechanism in an embodiment of the present invention for fixing a storage device to an electronic device comprises a frame and a detent component. The storage device having a fixing hole formed in at least one sidewall thereof. The frame has an accommodating space for receiving the storage device. One sidewall of the frame corresponding to the fixing hole has a plurality of fasteners and a latch member. The detent component is mounted within the fasteners and is movably disposed on the sidewall of the frame. The detent component has a pressing component and an operating component. The operating component has a first stop block and a second stop block. A stop surface of the first stop block is opposite to a stop surface of the second stop block respectively extended from two opposite ends of the operating component. A stop surface of the first stop block faces a stop surface of the second stop block, and the operating component is limited by any two fasteners through the stop blocks.

The operating component is pressed to make the second stop block depart from the fastener and the operating component is moved to make the pressing component move toward the latch member to push the latch member to engage with the fixing hole of the storage device, and to make the first stop block and the second stop block be held by any two fasteners in a press position, so that the storage device is fixed on the frame.

The operating component is pressed to make the first stop block depart from the two fasteners, the operating component is moved in a reverse direction, and the pressing component is moved away from the latch member, so that the latch member departs from the fixing hole in a release position, and the storage device is drawn out of the frame.

In view of the above, the present invention has the following beneficial effects. With the design that the latch member can be pressed/released through the displacement of the detent component along the slide direction and thus make the latch member lock/unlock the storage device. Accordingly, a user can install or remove the storage device without using any screw or hand tool, so that the installation/removal of the storage device is dramatically simplified, and the labor and time cost are greatly saved. Furthermore, in the present invention, the structure of the storage device fixing mechanism is simple, and thus the space occupied by the fixing mechanism and the manufacturing cost thereof can be reduced.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The fixing mechanism provided by the present invention is used for fixing a storage device, and the storage device may be, but is not limited to, a floppy disk drive (FDD), a hard disk drive (HDD), an optical disk drive (ODD) or other disk storage device. In the following detailed description of the present invention, an ODD is used as an embodiment of the present invention. The accompanying drawings are merely for reference and illustration, and are not intended to limit the present invention.

Figure 1:
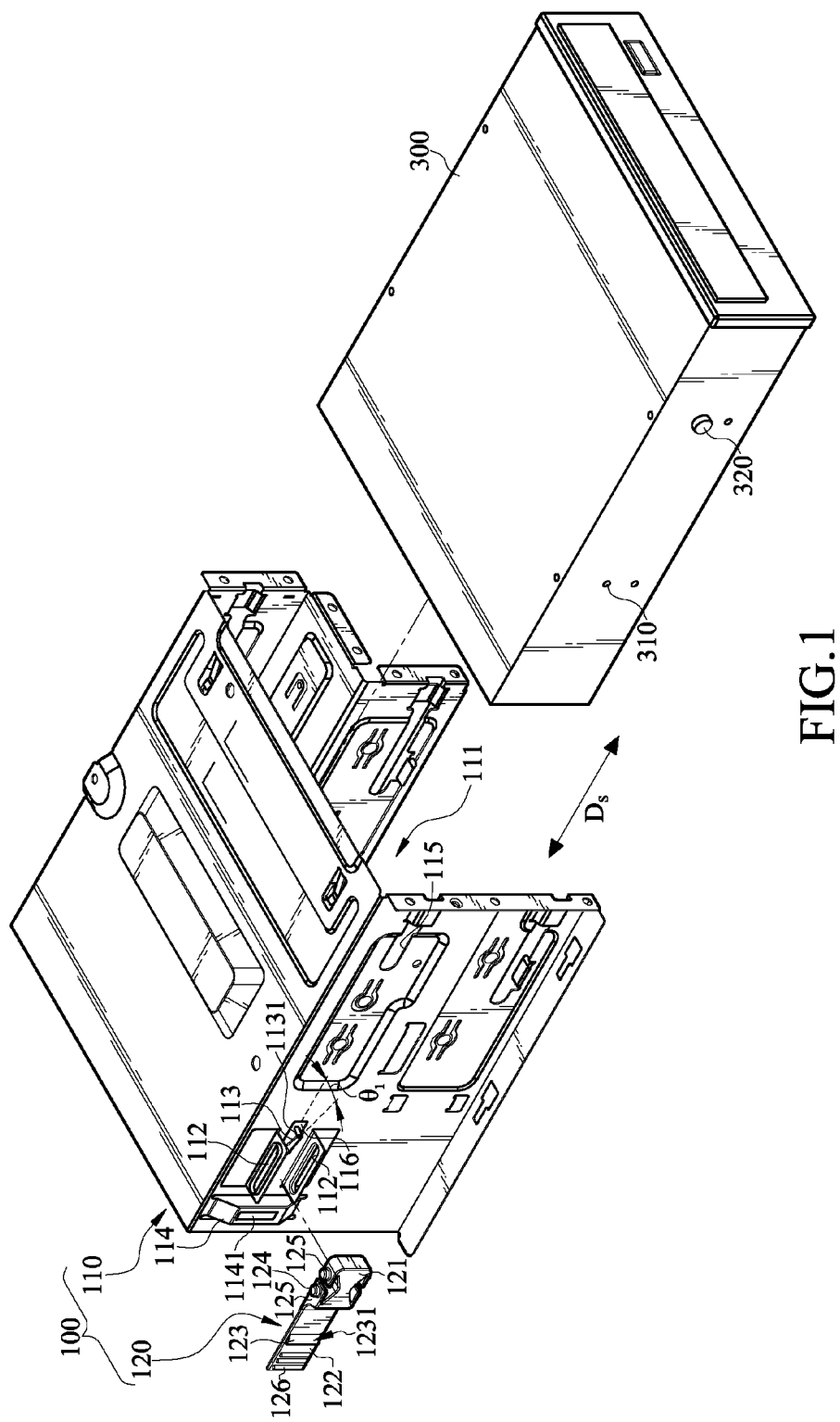
FIG. 1 is an exploded view of a fixing mechanism and a storage device according to a first embodiment of the present invention.
Figure 2:
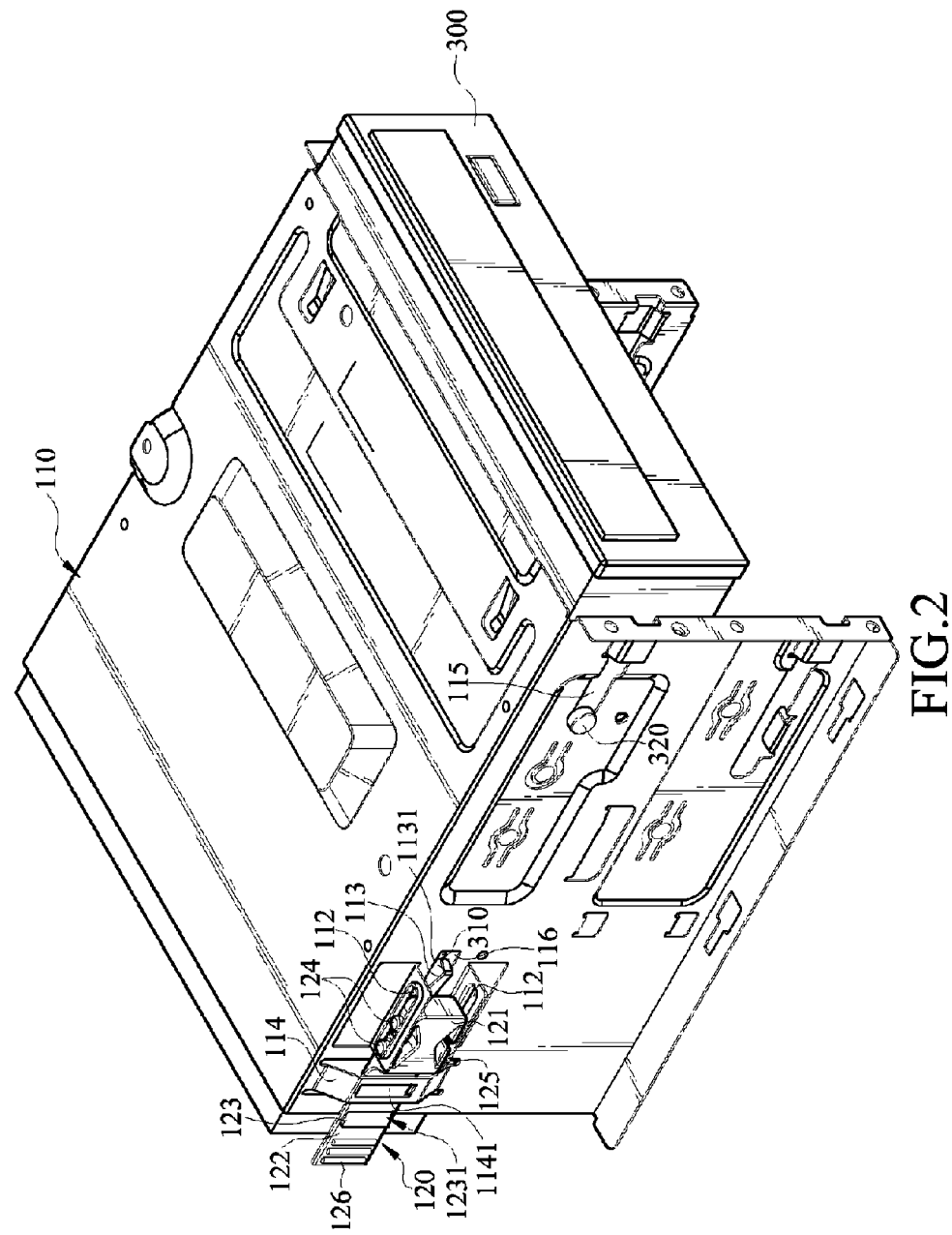
FIG. 2 is a three-dimensional view of the combination of the fixing mechanism and the storage device in FIG. 1.

FIG. 1 is an exploded view of a fixing mechanism and a storage device according to a first embodiment of the present invention and FIG. 2 is a three-dimensional view of the combination of the fixing mechanism and the storage device in FIG. 1. A fixing mechanism 100 is provided for fixing a storage device 300 in an electronic device, such as a computer. The fixing mechanism 100 is mounted on the computer housing. At least one side of the storage device 300 has a fixing hole 310.

The fixing mechanism 100 comprises a frame 110 and a detent component 120. The frame 110 is, for example, a drive bracket and is substantially in a π-shaped structure. Therefore, an accommodating space 111 is formed in the frame 110 to receive the storage device 300. Preferably, one sidewall of the frame 110 is recessed toward the accommodating space 111, so that the storage device 300 can be installed thereon to avoid dropping or offsetting from its preset position. A slide slot 115 having an open end and a closed end opposite to the open end is formed on another sidewall of the frame 110.

The storage device 300 has a guide component 320 (e.g. a screw or a rivet) which is screwed to or adhered to one side thereof corresponding to the slide slot 115. The guide component 320 and the fixing hole 310 may be disposed on the same side or opposite sides of the storage device 300, and the present invention is not limited thereto. To insert the storage device 300 into the accommodating space 111 of the frame 110, the guide component 320 enters and is embedded in the slide slot 115 of the frame 110 through the open end of the slide slot 115, and moves along the slide slot 115 until reaching the closed end of the slide slot 115. As the guide component 320 of the storage device 300 can slide linearly to-and-fro along the slide slot 115, the storage device 300 may be inserted in or pulled out from the frame 110 through the guide component 320 precisely.

As shown in FIG. 1 and FIG. 2, at least one sidewall of the frame 110 has a pair of guide rails 112 and a latch member 113. A protruding limit component 114 is further disposed on the sidewall of the frame 110 corresponding to the guide rails 112, and perpendicular to the guide rails 112. In this embodiment, the guide rails 112, the latch member 113, the limit component 114 and the frame 110 are formed from one piece of material such as a metal plate, but the present invention is not limited thereto. In this embodiment, the latch member 113 is a latch blade spring, but in some embodiments, the latch member 113 may be other kind of latch structure.

Specifically, two bent slices are disposed in parallel and separated from each other on the sidewall of the frame 110, and an opening 116 is formed between the two bent slices and corresponding to the fixing hole 310. The two bent slices are respectively provided with the guide rail 112 which is parallel to a slide direction Ds. The latch member 113 is located between the two guide rails 112. One end of the latch member 113 is fixed on the sidewall of the frame 110 and in a position next to one end of the opening 116. The latch member 113 extends along the longitudinal axis of the opening 116 toward the other end of the opening 116, and is shorter than the opening 116, so that the other end of the latch member 113 does not protrude from the other end of the opening 116. That is the length of the area formed by projecting the latch member 113 on the opening 116 overlaps a portion of the area of the opening. Besides, the other end of the latch member 113 is bent toward the outside of the frame 110 to form a free end over the frame 110, thus forming an angle θ1 with the sidewall of the frame 110 in a normal state.

At the free end, the latch member 113 further has a hook 1131 bent toward the inside of the accommodating space 111 of the frame 110, and corresponding to the opening 116 and the fixing hole 310. The limit component 114 protrudes from the sidewall of the frame 110, so that the top surface of the limit component 114 is at a distance from such sidewall. A limit hole 1141 is formed on the top surface of the limit component 114.

Figure 3:
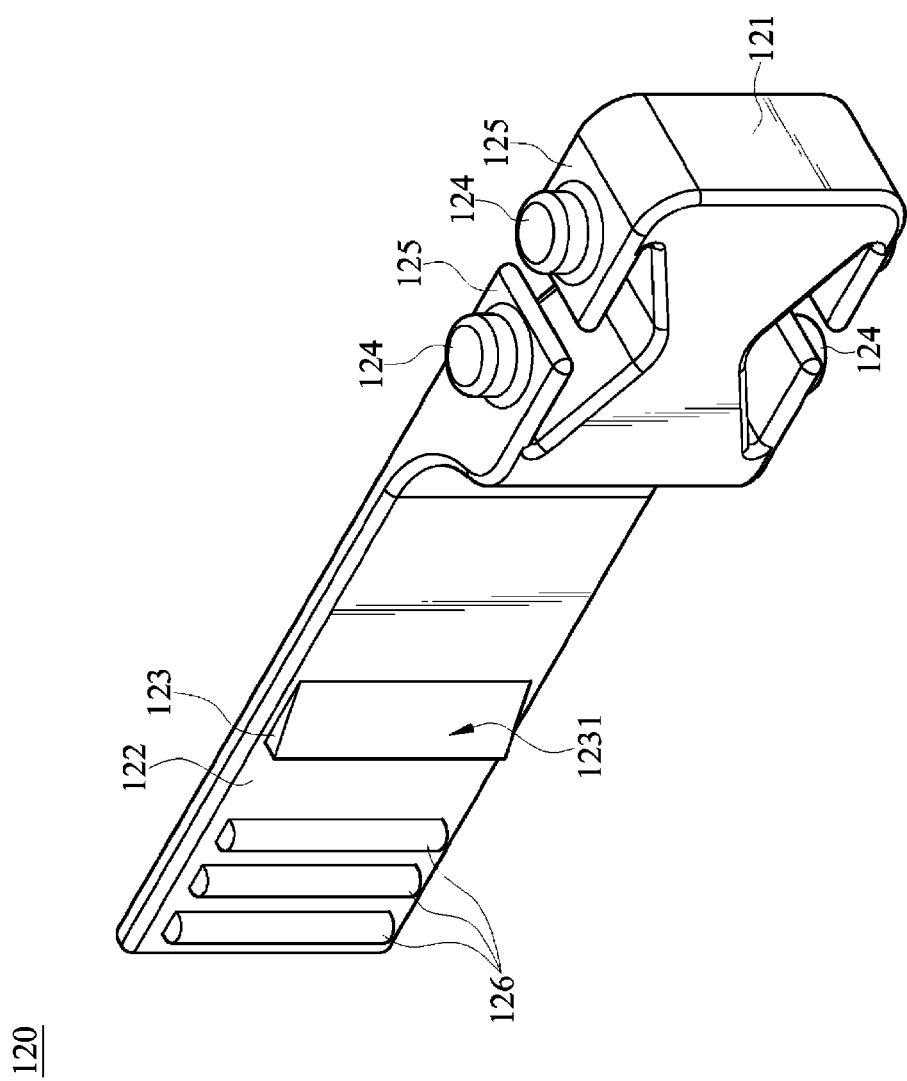
FIG. 3 is an enlarged three-dimensional view of the detent component in FIG. 1.

As shown in FIG. 3 as well as FIG. 1 and FIG. 2, the detent component 120 in this embodiment is a plate structure, and is movably disposed on the sidewall of the frame 110. The mechanism for assembling the detent component 120 to the sidewall of the frame 110 will be described later. The latch member 113 is bent toward the outside of the frame 110 in a normal state, and a slide path of the detent component 120 (along the direction Ds) overlaps the position of the latch member 113 in the normal state. Accordingly, for assembling the storage device 300 to the frame 110, the detent component 120 slides to the hook 1131 of the latch member 113 along the direction Ds, and then pushes and presses the latch member 113 to bend it toward the fixing hole 310 of the storage device 300. After that, the storage device 300 is fastened to the frame 110 by inserting the hook 1131 into the fixing hole 310.

On the other hand, for detaching the storage device 300 from the frame 110, the detent component 120 is moved back in reverse direction until the hook 1131 is released. Then, due to the restoring force of the latch member 113, the hook 1131 separates from the fixing hole 310 and returns to the normal state, so that the storage device 300 detaches from the frame 110 and can be pulled out of the frame 110 along the side slot 115.

The detent component 120 has a pressing component 121 and an operating component 122, which are connected to each other and made of plastic, rubber, or metal.

The thickness of the pressing component 121 may be larger than or equal to that of the operating component 122, but the present invention is not limited thereto. A protruding stop block 123 is disposed on a surface of the operating component 122. The stop block 123 has a guide slope 1231 corresponding to the limit component 114. Each of the two opposite sides of the pressing component 121 has a convex rib 124. The convex ribs 124 are disposed in the two guide rails 112 respectively, so that the pressing component 121 is movably connected to the guide rails 112, and capable of sliding linearly along the guide rails 112 in the direction Ds. Furthermore, the detent component 120 is at a distance D, which may be slightly longer than the height of the stop block 123 of the operating component 122, from the sidewall of the frame 110 (as shown in FIG. 4B).

Furthermore, by the cooperation of the convex ribs 124 of the pressing component 121 and the guide rails 112, the detent component 120 can slide to-and-fro between a release position and a press position along the slide direction Ds.

As shown in FIGS. 1 to 3, each of the two opposite sides of the pressing component 121 of the detent component 120 is further disposed with at least one elastic press portion 125 on which the convex rib 124 is placed. In this embodiment, the middle part of the main body of the pressing component 121 is slightly recessed and has a shape resembling an hourglass. One end of the elastic press portion 125 is connected to an end of the main body of the pressing component 121 away from the middle part, and the other end of it extends toward the middle part of the main body of the pressing component 121 for forming a floating end over the middle part. In this embodiment, there are two pairs of the elastic press portion 125 symmetrically disposed on the two opposite sides of the pressing component 121. Besides, four convex ribs 124 are symmetrically disposed on the elastic press portions 125. The elastic press portions 125 on each side of the pressing component 121 are separated and disposed at intervals, and the floating end of the elastic press portion 125 is also spaced away from the main body of the pressing component 121, so that the elastic press portions 125 can be pressed and deformed relative to the pressing component 121 with small force. However, this embodiment is not intended to limit the structure of the elastic press portion 125 of the present invention. In this case, if the detent component 120 is to be installed in the frame 110, the user only needs to press the elastic press portions 125 inward to make the elastic press portions 125 be slightly bent into the middle part of the main body of the pressing component 121. Once the convex ribs 124 on the elastic press portions 125 enter the guide rails 112 of the frame 110 successfully, the elastic press portions 125 are released to restore to the initial state, i.e. a force-free state, and lean against the guide rails 112, so that the pressing component 121 can slide linearly in the direction Ds.

On the other hand, when the detent component 120 is to be detached from the frame 110, only a small force is required to be applied to the elastic press portions 125 of the pressing component 121 to make the elastic press portions 125 be bent toward the middle part of the main body of the pressing component 121, so that the convex ribs 124 are detached from the guide rails 112, and the detent component 120 is separated from the frame 110.

As shown in FIG. 3, at least one protruding anti-slip strip 126 is disposed on a surface of the operating component 122 of the detent component 120, to prevent an operator from slipping when pushing or pulling the operating component 122.

It should be noted that, the configuration of the detent component 120 in this invention can be adjusted according to actual requirements, and the position and number of the guide rail 112, the elastic press portion 125, and the convex rib 124 may also be changed. For example, the elastic press portions 125 and the convex ribs 124 of different numbers are only disposed on either side of the pressing component 121, and the guide rails 112 of the frame 110 can also be adjusted according to the form of the elastic press portions 125 and the convex ribs 124; or, one elastic press portion 125 and one convex rib 124 are respectively disposed on the two opposite sides of the pressing component 121 in a symmetric or an asymmetric manner, and the guide rails 112 of the frame 110 is also adjusted according to the form of the elastic press portion 125 and the convex rib 124.

Moreover, the configuration of the anti-slip strip 126 of the operating component 122 may also be modified according to actual requirements, and the present invention is not limited thereto.

Figure 4A:
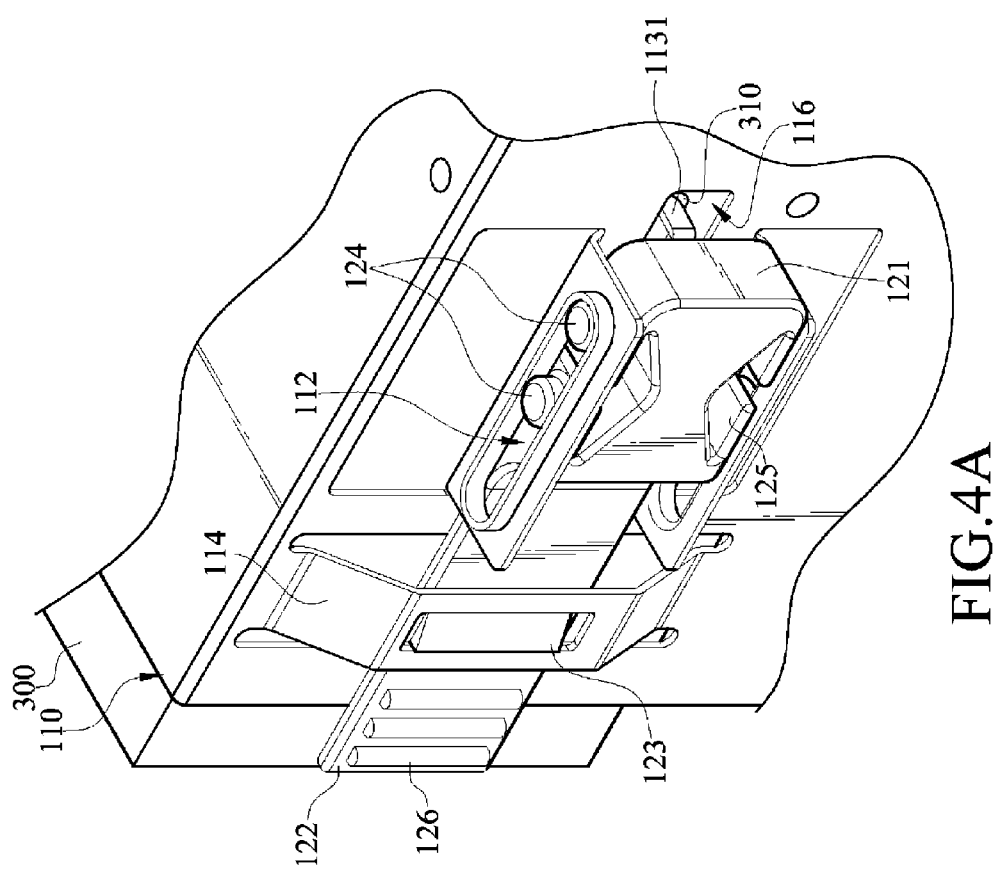
FIG. 4A is an enlarged three-dimensional view of the detent component in FIG. 2 in a press position.
Figure 4B:
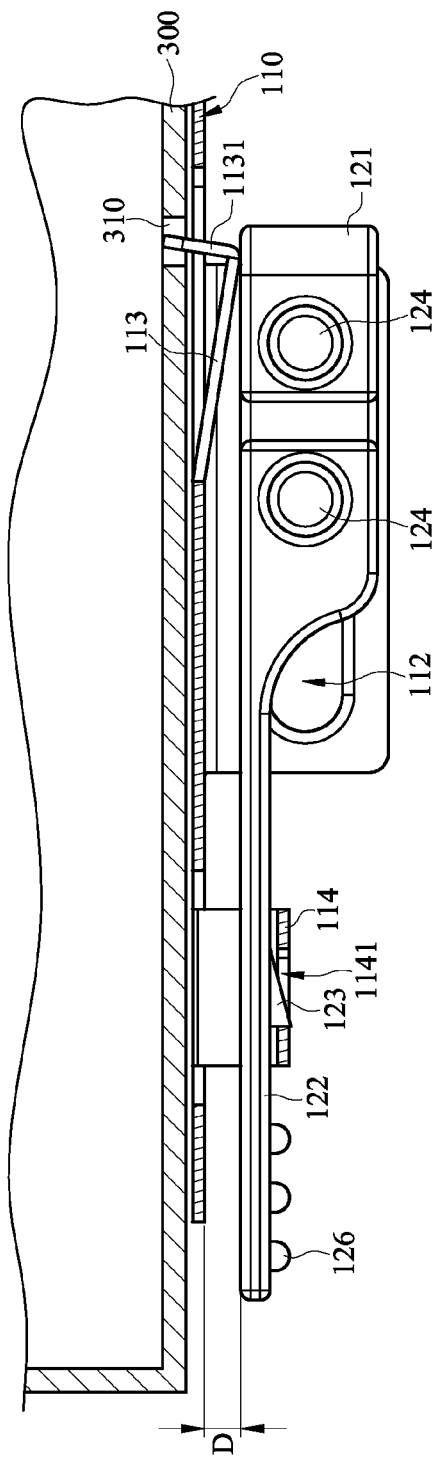
FIG. 4B is a top view of the detent component in FIG. 4A.

FIG. 4A and FIG. 4B are respectively an enlarged three-dimensional view of the detent component in FIG. 2 in a press position and a top view of the detent component in FIG. 4A.

As shown in the FIGS. 4A and 4B, for fixing the storage device 300 to the frame 110, the operating component 122 of the detent component 120 is moved toward the latch member 113 until the stop block 123 slides into the limit component 114. During the guide slope 1231 contacting and moving with respect to the limit component 114, the guide slope 1231 and the operating component 122 is pushed by the limit component 114 to deform toward the storage device 300 until the stop block 123 is below the limit hole 1141 of the limit component 114. Then, the operating component 122 is released and restores to the initial state, and the stop block 123 is embedded in the limit hole 1141. Furthermore, the pressing component 121 of the detent component 120 is in the press position when the stop block 123 is embedded in the limit hole 1141. In such press position, the pressing component 121 contacts and pushes the latch member 113 to force the latch member 113 to deform toward the storage device 300 and make the hook 1131 insert into the fixing hole 310 through the opening 116, and thus the storage device 300 is fastened to the frame 110.

Due to the interference between the stop block 123 and the limit hole 1141 of the limit component 114, the stop block 123 is limited to the limit hole 1141, so that the problem of the detent component 120 departing from the press position due to collision incurred by an external force or unconscious operations is prevented. In addition, because the detent component 120 is limited to the guide rails 112 through the convex ribs 124, it is stably held in the press position. Therefore, the detent component 120 keeps applying pressing force on the latch member 113 to effectively maintain the engagement of the hook 1131 to the fixing hole 310. Thus, the storage device 300 is well secured within the frame 110.

Figure 5A:
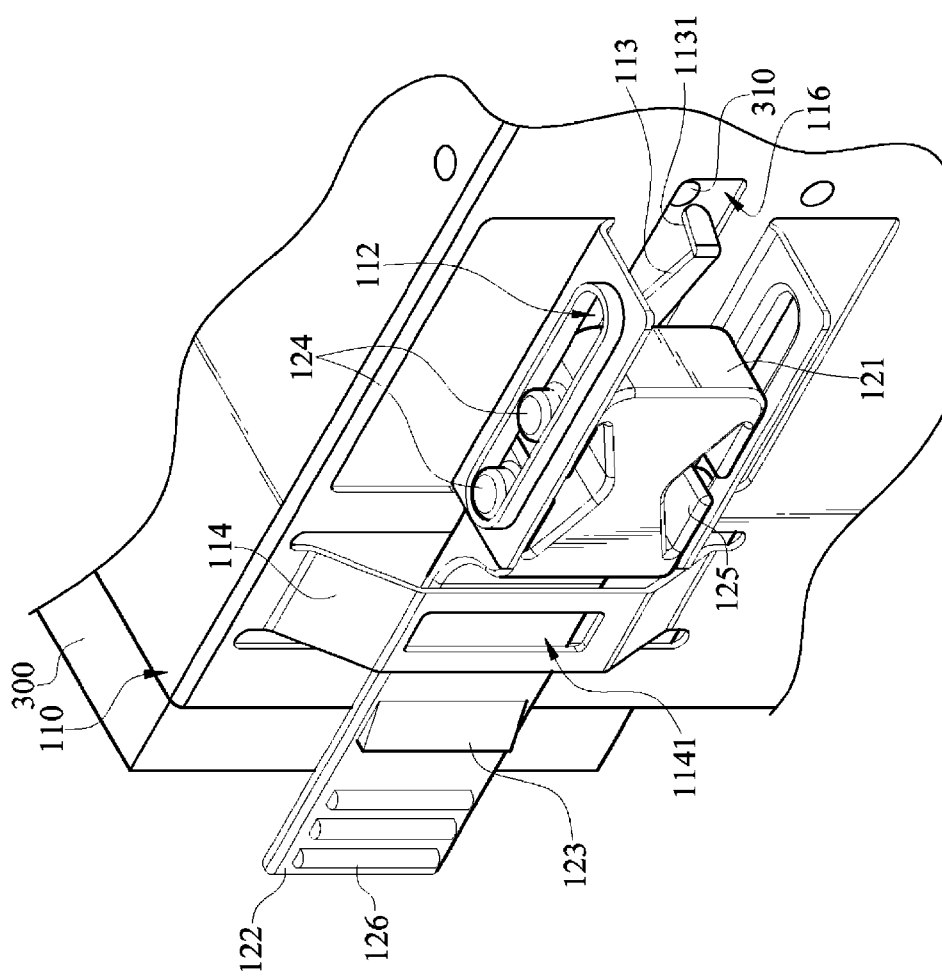
FIG. 5A is an enlarged three-dimensional view of the detent component in FIG. 2 in a release position.
Figure 5B:
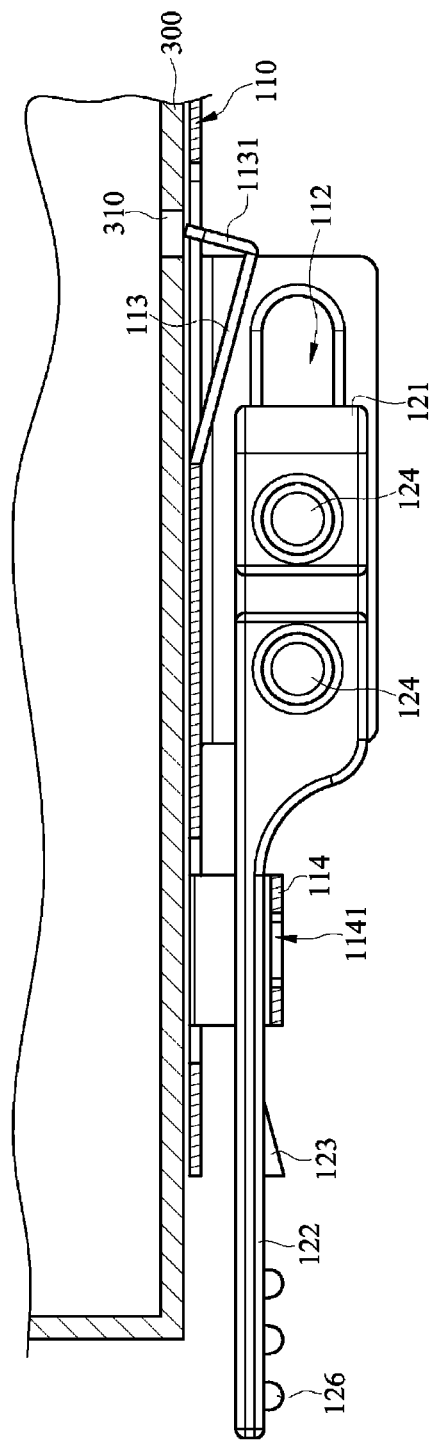
FIG. 5B is a top view of the detent component in FIG. 5A.

FIG. 5A and FIG. 5B are respectively an enlarged three-dimensional view of the detent component in FIG. 2 in a release position and a top view of the detent component in FIG. 5A.

As shown in the FIGS. 5A and 5B, for releasing the storage device 300 from the frame 110, the operating component 122 is pushed to deform toward the storage device 300 within the distance D from the operating component 122 to the frame 110 until that the stop block 123 departs from the limit hole 1141 of the limit component 114. Then, the operating component 122 is moved in a reverse direction until that the pressing component 121 of the detent component 120 moves to the release position. In such release position, the pressing component 121 does not contact the latch member 113, so that the pressing force applied by the pressing component 121 is removed; the latch member 113 is restored to the force-free state, and the hook 1131 departs from the fixing hole 310 of the storage device 300. Then, the latch member 113 is restored to the normal state, and forms the angle θ1 with the frame 110 (as shown in FIG. 1) again. Thus, the storage device 300 is unlocked, and then the storage device 300 can be pulled out of the frame 110.

FIGS. 6 to 8B are three-dimensional and sectional views according to a second embodiment of the present invention, which is similar to the first embodiment. The difference between the structures of the two embodiments is described below.

In the second embodiment, the fixing mechanism 200 comprises a frame 210 and a detent component 220. The frame 210 is, for example, a drive bracket, and an accommodating space 211 is formed inside the frame 210 to receive a storage device 300.

At least one sidewall of the frame 210 is disposed with a slide slot 214 which has an open end and a closed end. A guide component 320 is screwed on one side of the storage device 300 and corresponding to the slide slot 214, and is capable of sliding in the slide slot 214 of the frame 210.

Figure 6:
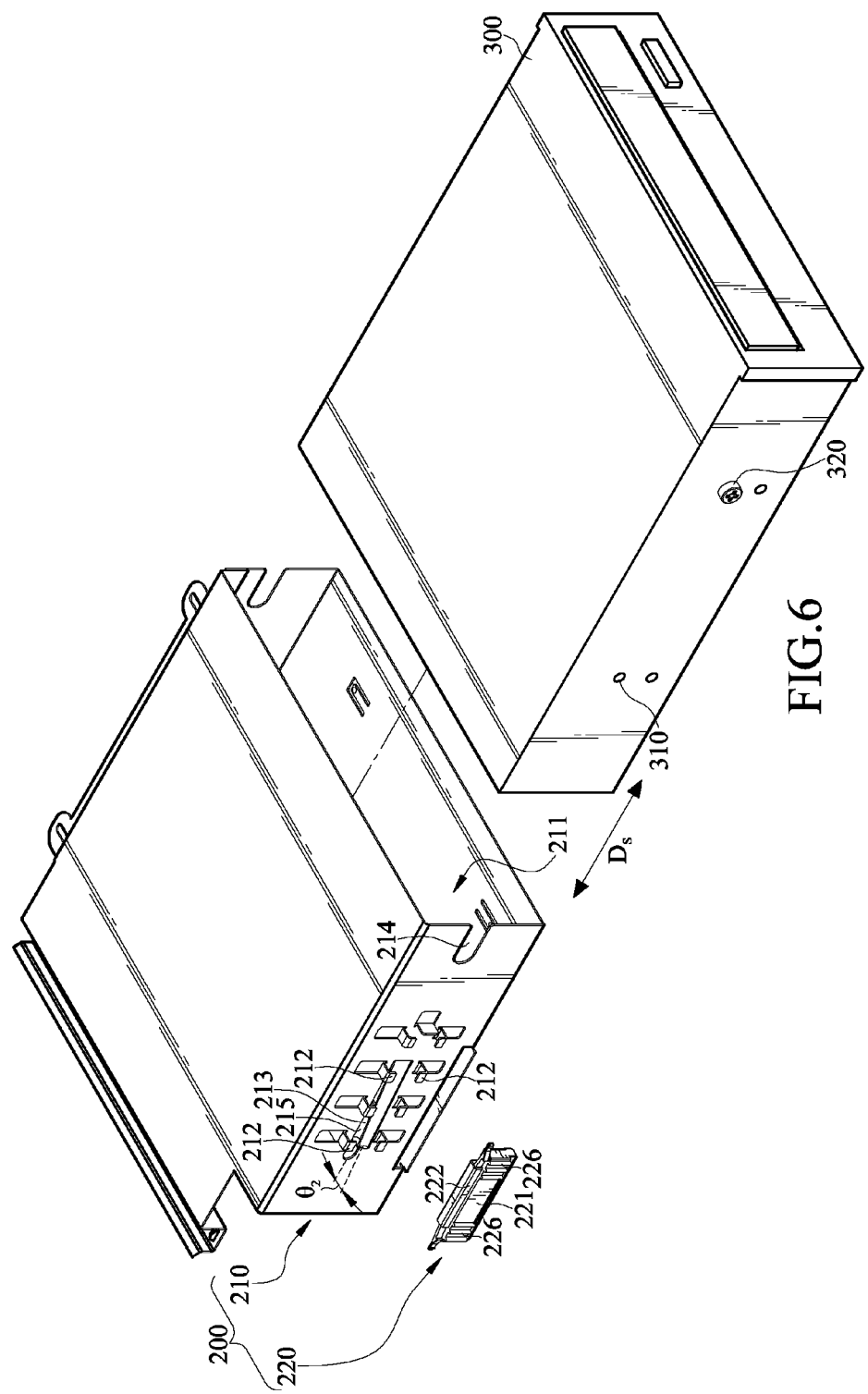
FIG. 6 is an exploded view of a fixing mechanism and a storage device according to a second embodiment of the present invention.
Figure 7:
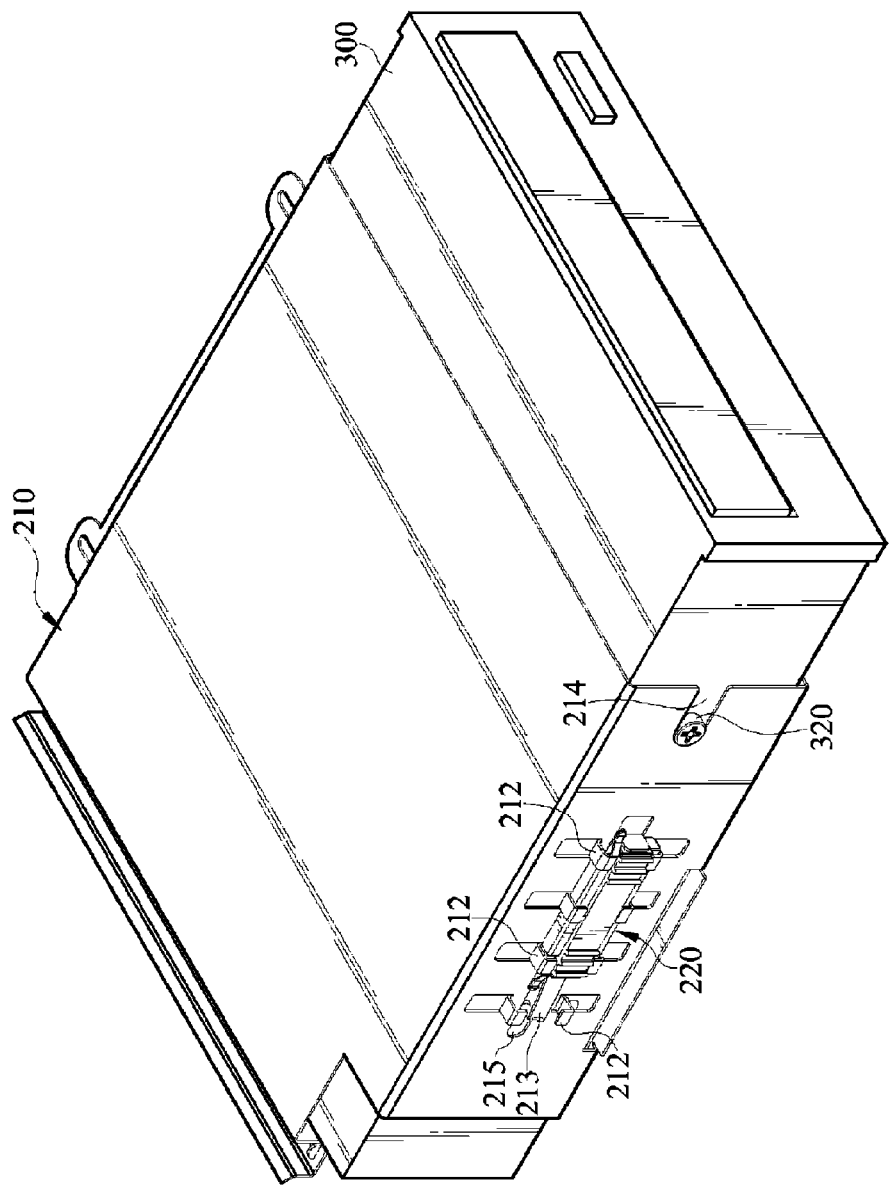
FIG. 7 is a three-dimensional view of the combination of the fixing mechanism and the storage device in FIG. 6.

As shown in FIG. 6 and FIG. 7, at least one sidewall of the frame 210 has a plurality of fasteners 212 and a latch member 213. In this embodiment, the fasteners 212 are arranged in two parallel rows and disposed in pairs. That is, each fastener 212 in an upper row matches with one fastener 212 in a lower row, and the fasteners 212 are disposed at intervals. It should be noted that, in some embodiments, the fasteners 212 are arranged in two parallel and staggered rows, disposed on the sidewall of the frame 210, and these embodiments of the arrangement of the fasteners are not intended to limit the present invention. Moreover, an opening 215 is formed between the fasteners 212 in two parallel rows and corresponding to the fixing hole 310.

One end of the latch member 213 is fixed on the sidewall of the frame 210 and in a position next to one end of the opening 215, and the latch member 213 extends along the longitudinal axis of the opening 215 and toward the other end of the opening 215. In addition, the latch member 213 is shorter than the opening 215, so that the other end of the latch member 213 does not protrude from the other end of the opening 215. Besides, the other end of the latch member 213 is bent toward the outside of the frame 210 and forms a floating end above the frame 210, thus forming an angle θ2 with the sidewall of the frame 210 in a normal state.

Figure 10A:
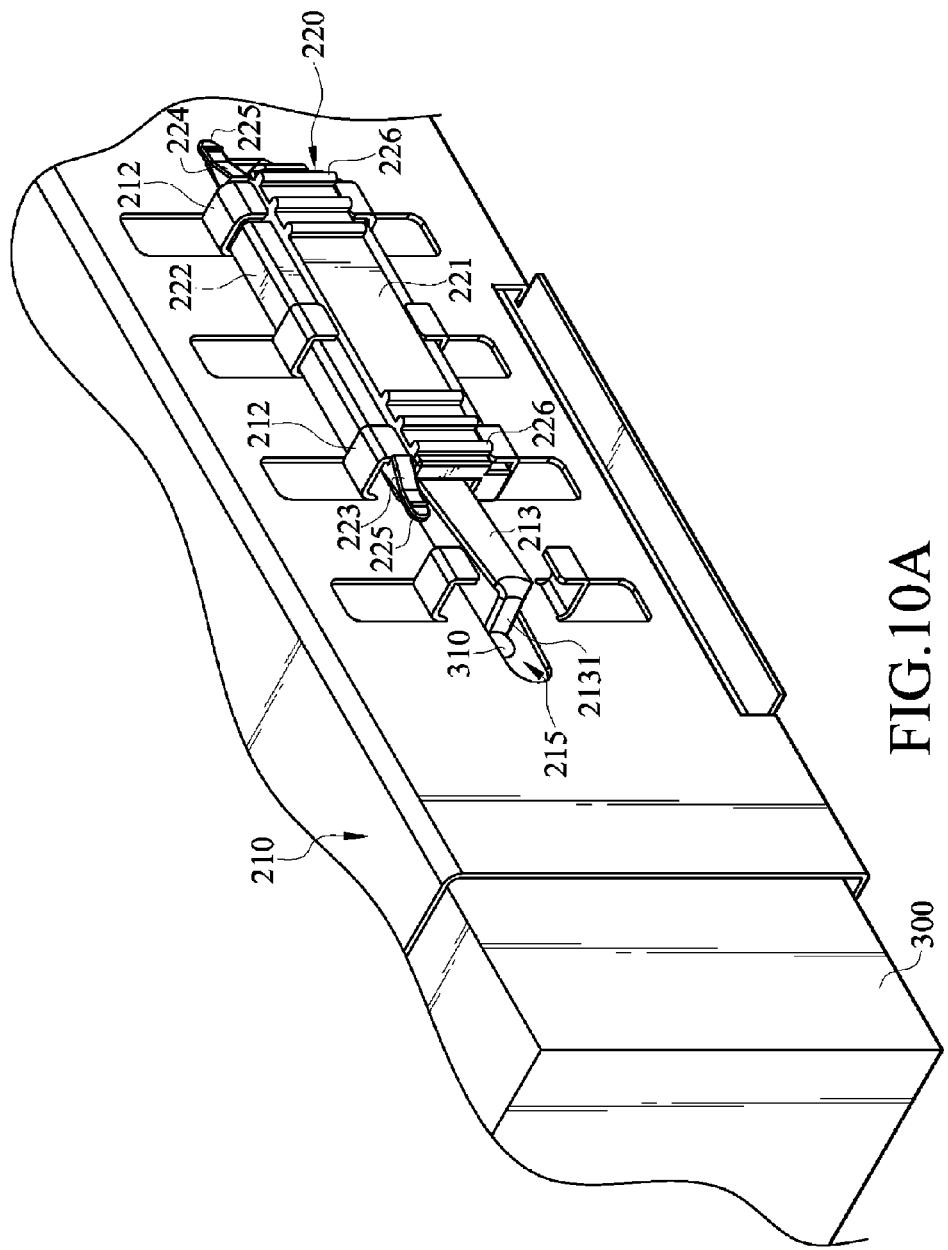
FIG. 10A is an enlarged three-dimensional view of the detent component in FIG. 7 in a release position.

At the floating end, i.e. a free end, the latch member 213 further has a hook 2131 bent toward the inside of the accommodating space 211 of the frame 210 (as shown in FIG. 10A), and corresponding to the opening 215 and the fixing hole 310.

Figure 8A:
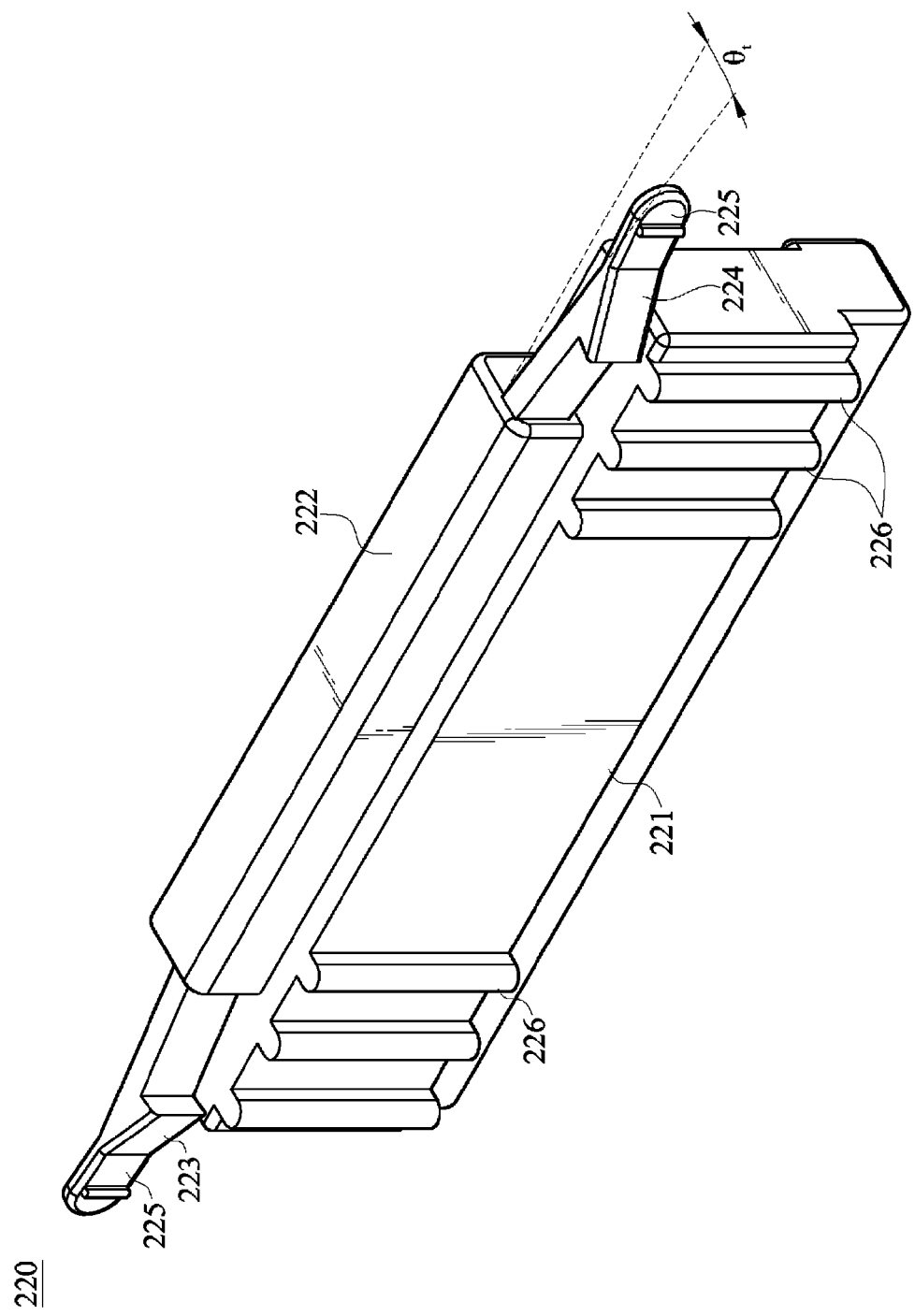
FIG. 8A is an enlarged three-dimensional view of the detent component in FIG. 6 at a view angle.
Figure 8B:
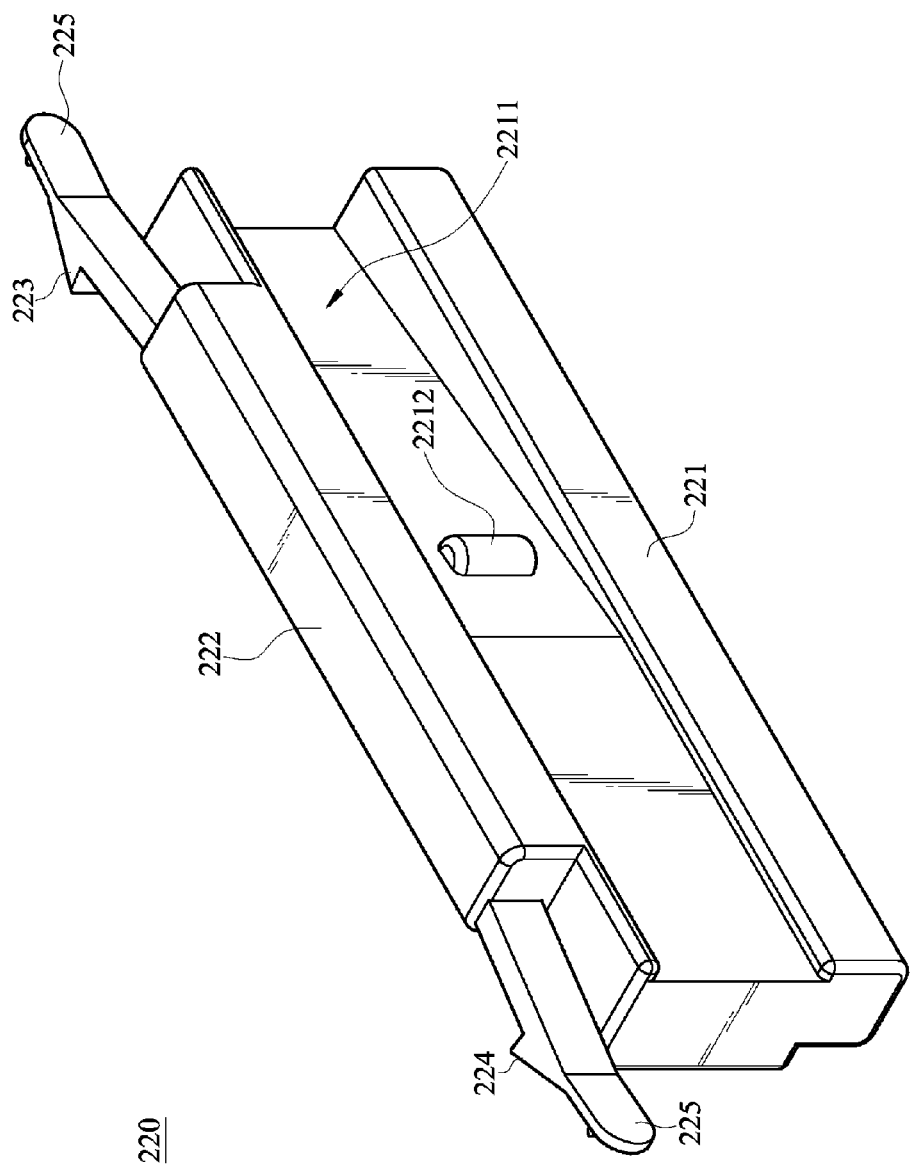
FIG. 8B is an enlarged three-dimensional view of the detent component in FIG. 6 at another view angle.

As shown in FIG. 8A and FIG. 8B as well as FIG. 6 and FIG. 7, the detent component 220 in this embodiment is a plate structure, and is movably within the fasteners 212 disposed on the sidewall of the frame 210. The mechanism for assembling the detent component 220 to the sidewall of frame 210 will be described later. The latch member 213 is bent toward the outside of the frame 210 in a normal state, and a slide path of the detent component 220 (along a direction Ds) overlaps the position of the latch member 213 in the normal state. Accordingly, for assembling the storage device 300 to the frame 210, the detent component 220 slides to the latch member 213 along the direction Ds, and then pushes and presses the latch member 213 to bend it toward the fixing hole 310 of the storage device 300. After that, the storage device 300 is fastened to the frame 210 by inserting the hook 2131 into the fixing hole 310. On the other hand, for detaching the storage device 300 from the frame 210, the detent component 220 is moved back in reverse direction for releasing the hook 2131. Then, due to the restoring force, the hook 2131 separates from the fixing hole 310 until returning to the normal state, so that the storage device 300 detaches from the frame 210 and can be pulled out of the frame 210.

The detent component 220 has a pressing component 221 and an operating component 222, which are connected to each other and made of plastic, rubber, or metal, but the present invention is not limited thereto. The operating component 222 may be disposed on two opposite sides or on one side of the pressing component 221. In this embodiment, the operating component 222 is located on one side, such as upper side, of the pressing component 221, and a first stop block 223 and a second stop block 224 respectively extend from two opposite ends of the operating component 222 for limiting the operating component 222 by clipping onto any two fasteners 212. Each of the first and the second stop blocks 223, 224 has a stop surface directly across from each other and a guide slope facing away from the operating component 222.

The detent component 220 is disposed between the two rows of the fasteners 212. The operating component 222 is held by one row of the fasteners 212, and the side of the pressing component 221 opposite to the operating component 222 is held by the other row of the fasteners 212, so that the detent component 220 can slide to-and-fro between a release position and a press position along the slide direction Ds. Preferably, the pressing component 221 and the operating component 222 each may further have a guide groove parallel to the slide direction Ds. Accordingly, the detent component 220 is joined to the two rows of the fasteners 212 through the guide grooves of the pressing component 221 and the operating component 222, and thus the reliability and the stability of the detent component 220 are improved while the detent component 220 slides to-and-fro along the slide direction Ds. In addition, the operating component 222 is at a distance D from the sidewall of the frame 210 (as shown in FIG. 9B), and the distance D is the maximum distance between the operating component 222 and the frame 210 in a normal state (force-free state).

As shown in FIGS. 6 to 8B, the detent component 220 in this embodiment further has two pressed portions 225, which respectively protrudes from the first stop block 223 and the second stop block 224. The two opposite ends of the operating component 222 of the detent component 220 are bent outwards (toward the outside of the frame 210), and forms an angle θt with the frame 210 (as shown in FIG. 8A), which improves the reliability of holding the detent component 220 between the fasteners 212. At least one protruding anti-slip strip 226 is disposed on a surface of the pressing component 221 of the detent component 220, to prevent an operator from slipping when pushing or pressing the pressing component 221.

Furthermore, a guide slope 2211 is disposed on an inner surface of the pressing component 221 facing the frame 210, and inclines toward the latch member 213. That is, the thickness of the pressing component 221 gradually decreases along the direction toward the latch member 213. In addition, the guide slope 2211 is further disposed with a protruding press block 2212.

Figure 9A:
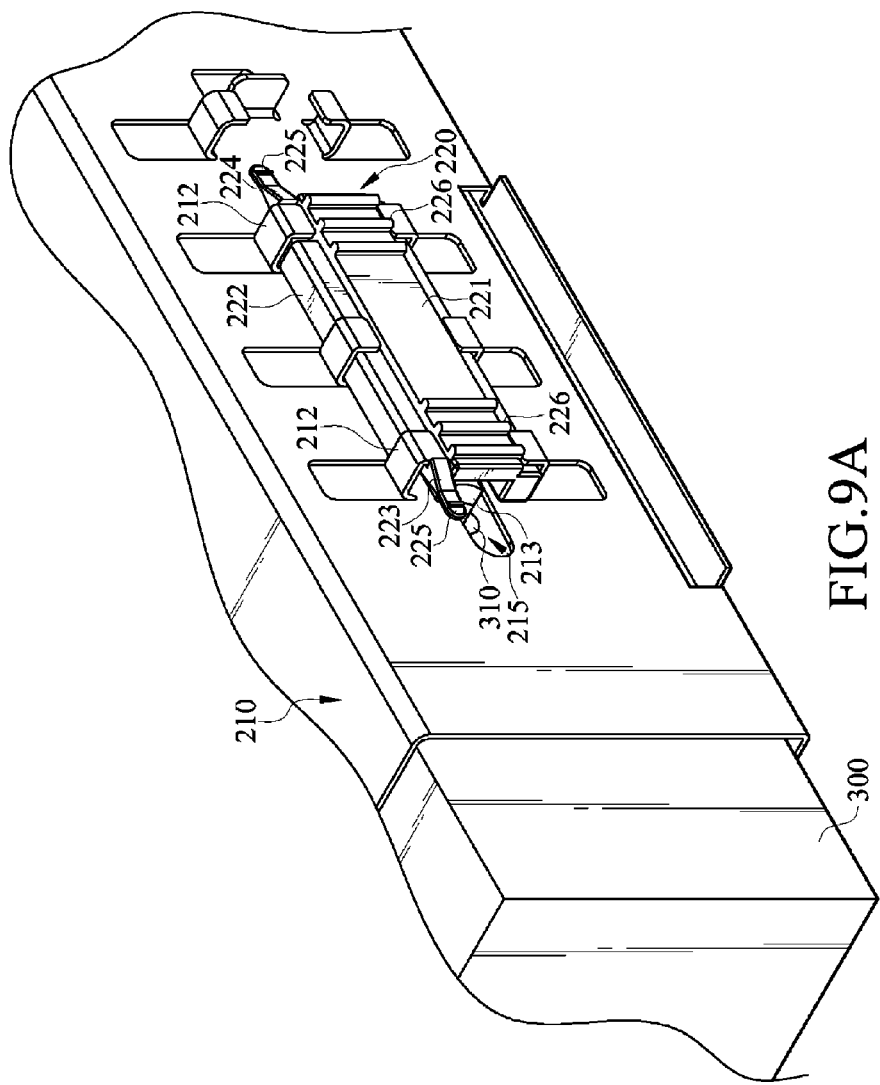
FIG. 9A is an enlarged three-dimensional view of the detent component in FIG. 7 in a press position.
Figure 9B:
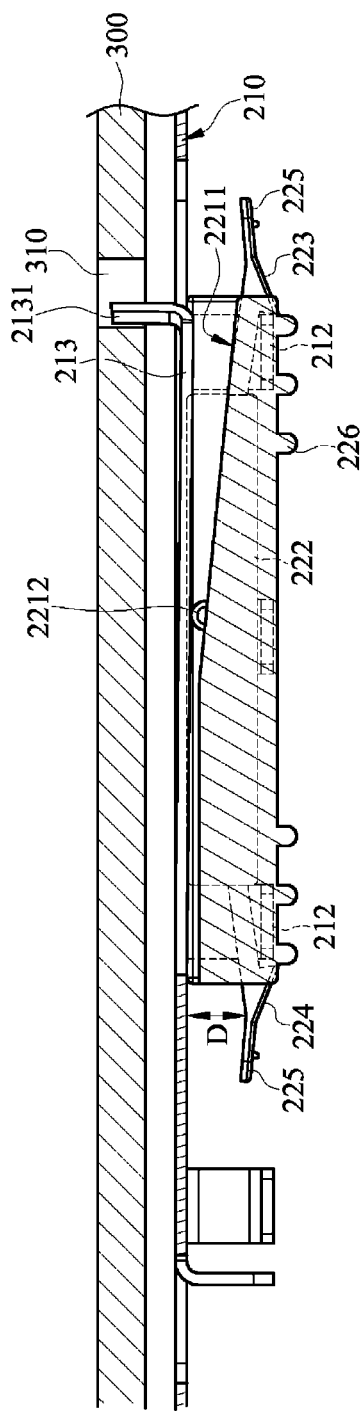
FIG. 9B is a top view of the detent component in FIG. 9A.

FIG. 9A and FIG. 9B are respectively an enlarged three-dimensional view of the detent component in FIG. 7 held by the fasteners in a press position and a top view of the detent component in FIG. 9A.

As shown in the FIGS. 9A-9B, in this embodiment, for fixing the storage device 300 to the frame 210, the pressed portions 225 is pressed to force the operating component 222 to deform toward the frame 210, and therefore the stop surface of the second stop block 224 departs from the fastener 212 until the detent component 220 is unlocked and can be pushed forward. Then, the operating component 222, between the two rows of the fasteners 212, is moved toward the latch member 213 until reaching the press position. During the operating component 222 being moved toward the press position, the first stop block 223 on the operating component 222 slides in the fastener 212 of the frame 210 from right to left through the guide slope thereof. Then, in the press position, the first stop block 223 and the second stop block 224 are held by two fasteners 212 in the same raw respectively. The stop surface of the first stop block 223 faces that of the second stop block 224, so that the detent component 220 is held by the fasteners 212 and cannot slide backwards along the slide direction Ds from the press position. Besides, in such press position, the pressing component 221 contacts the latch member 213 with the guide slope 2211 thereof, so that the latch member 213 is forced to be bent toward the storage device 300. In addition, the hook 2131 of the latch member 213 is inserted into the fixing hole 310 of the storage device 300 through the opening 215 in the frame 210. Since the press block 2212 of the operating component 222 keeps applying a pressing force to the latch member 213 to effectively maintain the engagement of the hook 2131 to the fixing hole 310 the storage device 300 is firmly fastened to and secured within the frame 210.

Figure 10B:
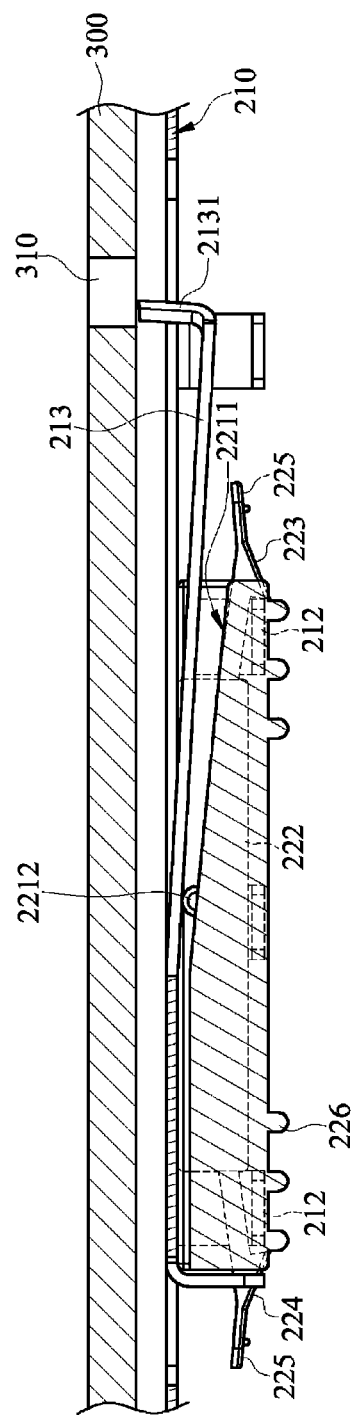
FIG. 10B is a top view of the detent component in FIG. 10A.

FIG. 10A and FIG. 10B are respectively is an enlarged three-dimensional view of the detent component in FIG. 7 held by the fasteners in a release position and a top view of the detent component.

As shown in the FIGS. 10A-10B, in this embodiment, for releasing the storage device 300 from the frame 210, the operating component 222 of the detent component 220 is moved away from the latch member 213 by pressing the pressed portions 225 within distance D to force the operating component 222 to deform toward the frame 210 and make the stop surface of the first stop block 223 depart from the fastener 212 until the detent component 220 is unlocked. Then, the operating component 222, between the two rows of the fasteners 212, can be pulled backward (moved in a reverse direction) to a release position.

In the release position, the pressing component 221 does not contact the latch member 213. In this embodiment, preferably, a limit slice is disposed on the sidewall of the frame 210. The limit slice is disposed corresponding to the pressing component 221 of the detent component 220, and is used for limiting the detent component 220 in the release position. The latch member 213 is restored to the force-free state as the pressing component 221 is released, so that the hook 2131 departs from the fixing hole 310 of the storage device 300. Thereby, the latch member 213 is restored to the normal state, and forms an angle θ2 with the frame 210 again (as shown in FIG. 6). That is, the storage device 300 can be drawn from the frame 210.

In the fixing mechanism for storage device of the present invention, the latch member can be pushed/released through the displacement of the detent component along the slide direction Ds, and thus make the latch member lock/unlock the fixing hole of the storage device. That is, the storage device is fixed in the frame or detached from the frame depending on the resilient deformation of the latch member, so that the storage device can be easily installed into or removed from the computer housing. By using the fixing mechanism of the present invention, the user can install or remove the storage device without using any screw or hand tool, so that the installation/removal of the storage device is dramatically simplified, and the labor and time cost are greatly saved.

Furthermore, in the present invention, the structure of the fixing mechanism is simple, the installation is easy and convenient, and the space occupied by the fixing mechanism and the manufacturing cost thereof can be largely reduced.

While the invention has been disclosed with respect to a limited number of embodiments, numerous modifications and variations will be appreciated by those skilled in the art. It is intended, therefore, that the following claims cover all such modifications and variations that may fall within the true spirit and scope of the invention.

What is claimed is:

1. A fixing mechanism fixing a storage device to an electronic device, comprising:

a frame having an accommodating space for receiving the storage device, wherein the storage device has a fixing hole formed in at least one sidewall of the storage device, one sidewall of the frame corresponding to the fixing hole has a guide rail and a latch member, the latch member is integrally formed with the frame, a free end of the latch member is bent toward the outside of the frame, and forms an angle with the sidewall of the frame when the storage device is not inserted to the accommodating space, the free end of the latch member has a hook bent toward the inside of the accommodating space and corresponding to the fixing hole, and the sidewall of the frame has a limit component corresponding to the guide rail; and a detent component movably disposed on the sidewall of the frame and having a pressing component and an operating component, wherein the pressing component is movably connected to the guide rail, and the operating component has a stop block, wherein when fixing the storage device to the frame, the operating component is moved to make the pressing component move toward the latch member along the guide rail to push the hook of the latch member to engage with the fixing hole of the storage device, and to make the stop block stop at the limit component in a press position; and wherein when releasing the storage device from the frame, the operating component is pressed to make the stop block depart from the limit component, and the operating component is moved in a reverse direction, and the pressing component is moved away from the latch member, so that the latch member departs from the fixing hole of the storage device in a release position, and the storage device is drawn out of the frame.

2. The fixing mechanism according to claim 1, wherein the sidewall of the frame has a pair of guide rails opposite to each other, each side of the pressing component has a convex rib, and the convex ribs are inserted into the guide rails respectively and are capable of sliding with respect to the guide rails.

3. The fixing mechanism according to claim 2, wherein each side of the pressing component has a floating elastic press portion, the convex ribs are disposed on the elastic press portions respectively, and a floating end of the elastic press portion is spaced apart from the pressing component by a first distance.

4. The fixing mechanism according to claim 1, wherein the operating component has at least one anti-slip strip.

5. The fixing mechanism according to claim 1, wherein the operating component is moved in a direction parallel to the guide rail and the limit component is perpendicular to the direction and corresponding to the guide rail.

6. The fixing mechanism according to claim 1, wherein the sidewall of the frame has an opening corresponding to the fixing hole.

7. The fixing mechanism according to claim 3, wherein when the detent component is to be detached from the frame, the elastic press portions is pressed to be bent toward a middle part of the pressing component for detaching the convex ribs from the guide rails and separating the detent component from the frame.

8. The fixing mechanism according to claim 1, wherein the detent component is at a second distance from the sidewall of the frame and the second distance is longer than the height of the stop block.

9. The fixing mechanism according to claim 1, wherein the frame and the storage device are moved relative to each other when fixing the storage device to the frame and releasing the storage device from the frame.

* * * * *